E. G. LATTA.

RIBBON MECHANISM.

APPLICATION FILED JAN. 26, 1916.

Reissued July 2, 1918.

14,491.

4 SHEETS—SHEET 1.

WITNESSES:

Juliuett Mitz

Ethel C. Hartz

INVENTOR

Emmit G. Latta

BY

Criswell & Criswell

ATTORNEYS

E. G. LATTA.

RIBBON MECHANISM.

APPLICATION FILED JAN. 26, 1916.

Reissued July 2, 1918.

14,491.

4 SHEETS—SHEET 2.

WITNESSES

Julius Theo.

Ethel C. Hartz

INVENTOR

Emmit G. Latta

BY

Criswell & Criswell

ATTORNEYS

E. G. LATTA.

RIBBON MECHANISM.

APPLICATION FILED JAN. 26, 1916.

Reissued July 2, 1918.

14,491.

4 SHEETS—SHEET 3.

WITNESSES

Julian H. Smith

Ethel C. Harts

INVENTOR

Emmit G. Latta

BY

Criswell & Criswell

ATTORNEYS

E. G. LATTA.

RIBBON MECHANISM.

APPLICATION FILED JAN. 26, 1916.

Reissued July 2, 1918.

14,491.

4 SHEETS—SHEET 4.

WITNESSES:

Julius A. Smith

Ethel C. Harty

INVENTOR

Emmit G. Latta

BY

Criswell & Criswell

ATTORNEYS

UNITED STATES PATENT OFFICE.

EMMIT G. LATTA, OF SYRACUSE, NEW YORK, ASSIGNOR TO CORONA TYPEWRITER COMPANY, INC., A CORPORATION OF NEW YORK.

RIBBON MECHANISM.

14,491. Specification of Reissued Letters Patent. Reissued July 2, 1918.

Original No. 1,168,654, dated January 18, 1916, Serial No. 661,516, filed November 21, 1911. Application for reissue filed January 26, 1916. Serial No. 74,485.

*To all whom it may concern:*

Be it known that I, EMMIT G. LATTA, a citizen of the United States, residing at Syracuse, in the county of Onondaga and State of New York, have invented a new and useful Improvement in Ribbon Mechanism, of which the following is a specification.

This invention relates more particularly to improvements in ribbon operating mechanisms for visible writing or front strike typewriting machines. The mechanism is designed especially for use on a collapsible front strike typewriter of the construction disclosed in my application for patent, Serial No. 658,153, filed Nov. 2, 1911, and is herein illustrated and described in connection with such machine, but it is not thereby intended to limit the use of the invention to machines of that character since the ribbon operating mechanism is applicable to other kinds of typewriters.

The objects of this invention are to provide efficient and desirable mechanism of simple, compact and inexpensive construction for feeding the ink ribbon lengthwise, for automatically reversing the direction of feed of the ribbon when it reaches the end of its travel in one direction, and for vibrating the ribbon to and from the position for printing; also to provide a ribbon vibrating mechanism of very compact and simple construction by which the throw of the vibrator can be quickly and easily changed to permit the use of different portions or fields of the ribbon; also to provide a ribbon operating mechanism for collapsible typewriting machines which is constructed and arranged so as to enable the machine to be collapsed into compact form.

In the accompanying drawings consisting of four sheets:

Like reference characters refer to like parts in the several figures.

Figures 1, 2, 3, 4:
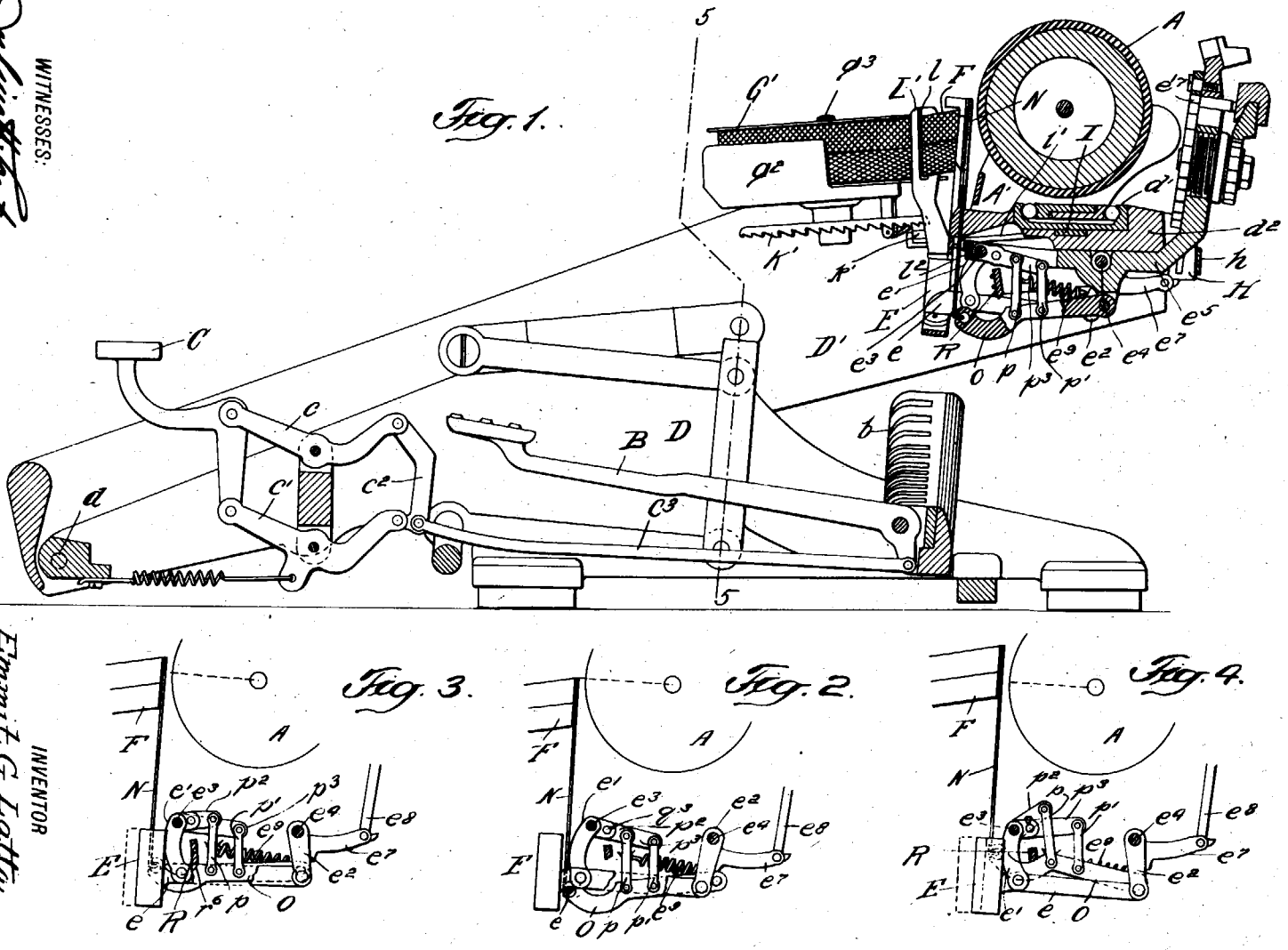
Figure 1 is a fragmentary longitudinal sectional elevation of a collapsible typewriting machine provided with ribbon operating mechanism embodying the invention.
Fig. 2 is a sectional elevation of the ribbon vibrating mechanism, showing the normal position thereof.
Fig. 3 is a similar view showing the elevated position thereof when adjusted for using the upper portion of the ribbon.
Fig. 4 is a similar view showing the elevated position thereof when adjusted for using the lower portion of the ribbon.
Figures 5, 6:
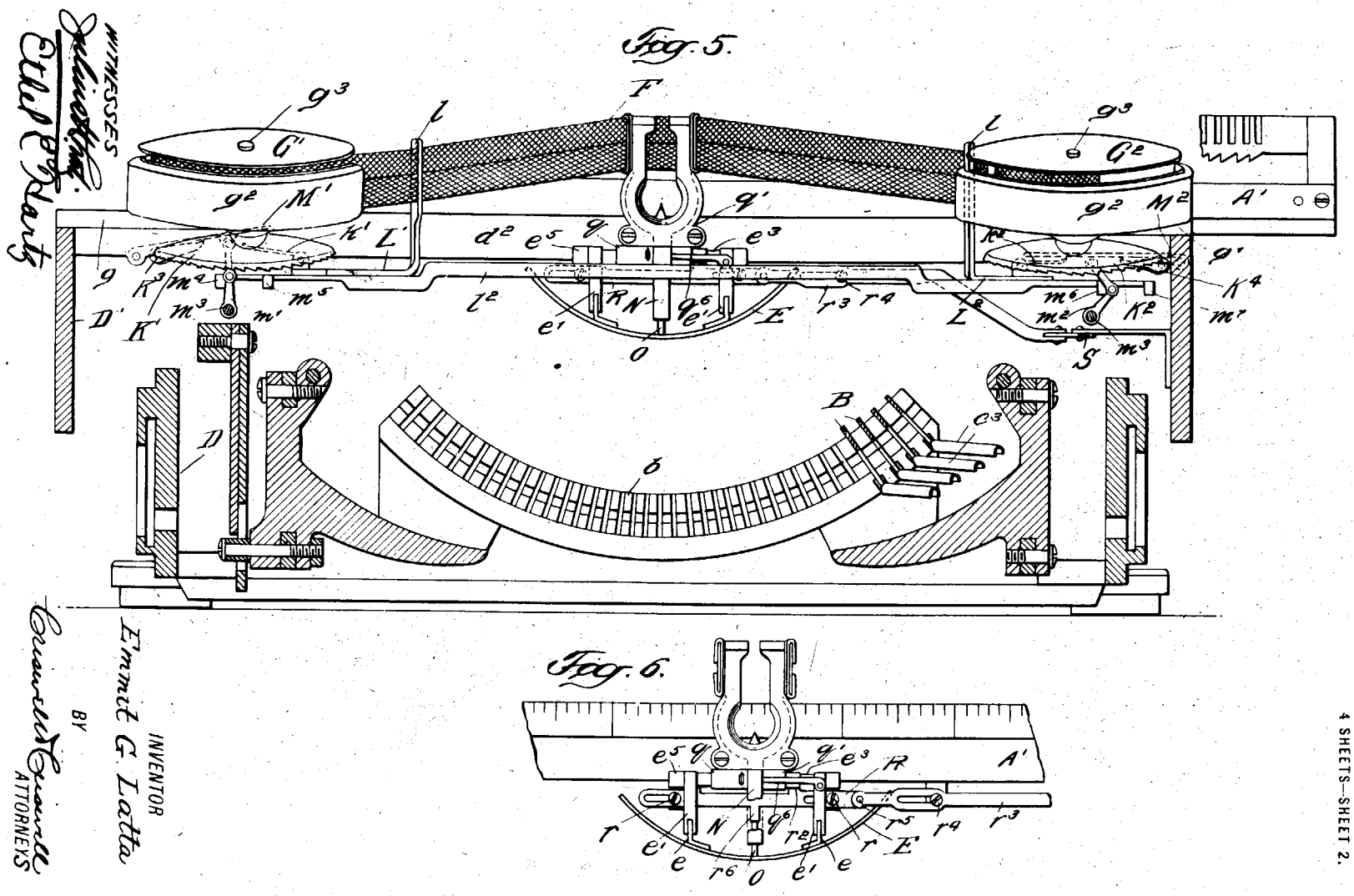
Fig. 5 is a fragmentary transverse sectional elevation of the machine in line 5—5, Fig. 1.
Fig. 6 is a front elevation of the ribbon vibrating mechanism.
Figures 7, 8:
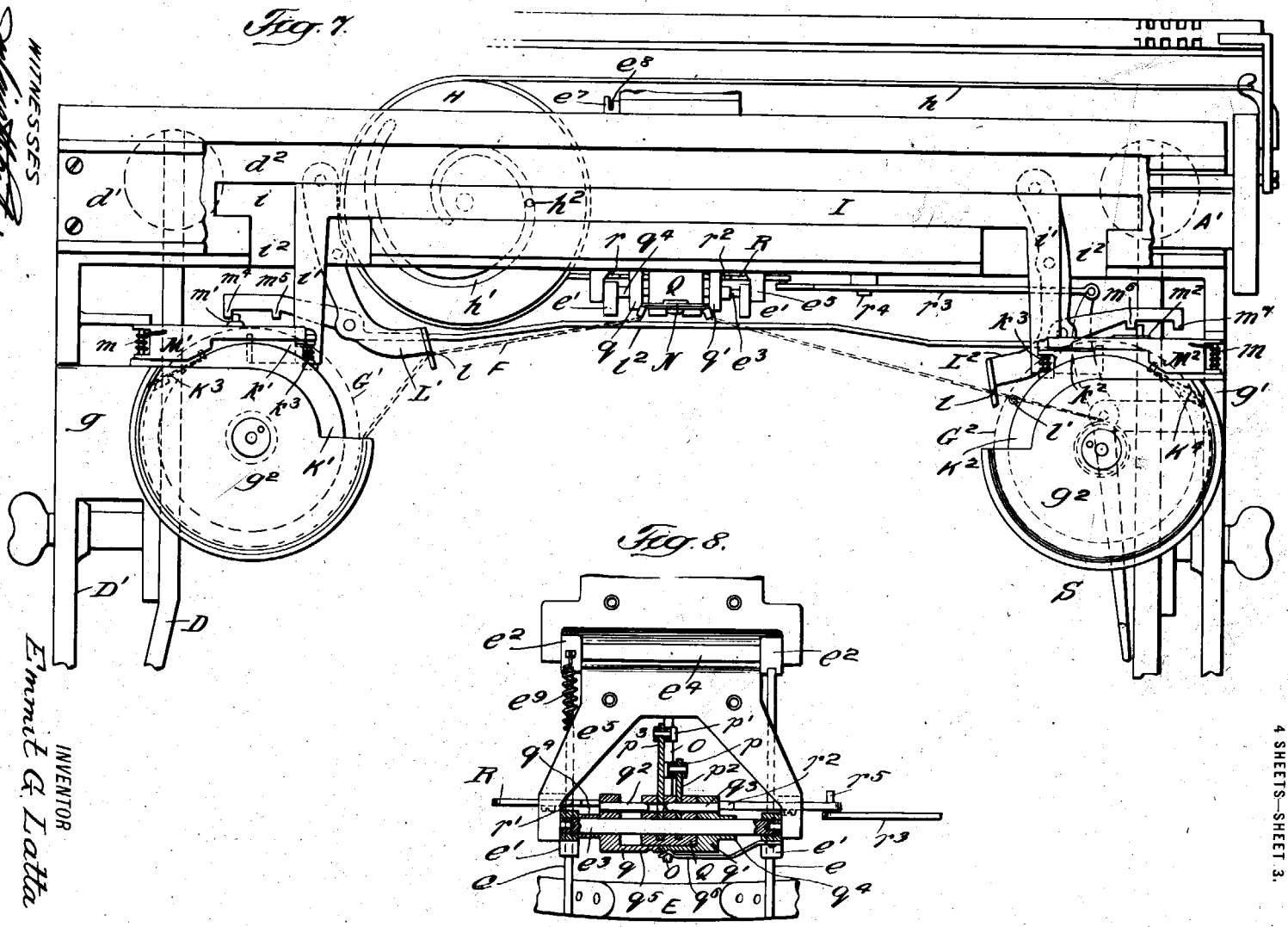
Fig. 7 is a fragmentary plan view of the machine.
Fig. 8 is a sectional plan view of the vibrating mechanism.

A represents the rotatable paper platen of a front strike typewriting machine, A′ the carriage on which the platen is journaled, B the type bars, *b* the segment on which the type bars are pivoted to swing upwardly and rearwardly to strike the platen, and C one of the type bar-actuating finger keys which are supported by key levers *c c′* connected by links $c^2$ and rods $c^3$ to the type bars. The machine illustrated in the drawings is the same as that disclosed in the above mentioned application, and the parts above mentioned are preferably constructed and arranged as in the machine of said application. Each of the type bars is provided with a plurality of type or characters and the segment is movably mounted and adapted to be shifted for placing one or another set of the characters in printing relation to the platen.

The type bars and their key actions are mounted on a base or stationary section D of the main frame of the machine while the carriage is mounted on a movable frame section D′. Each of these parts consists of a rigid substantially rectangular frame. The movable frame is larger than and surrounds the stationary frame and is pivoted thereto at its front end by pivots at opposite sides of the machine, one of which is indicated at *d* Fig. 1. The carriage travels horizontally on a suitable guide or track *d′* supported on the rear cross bar $d^3$ of the movable frame. The movable frame is adapted to support the carriage in the elevated operative position, shown in Fig. 1, and to be moved to lower the carriage to an inoperative position in rear of the type bar segment for collapsing the machine, as explained in said application.

E represents the universal bar which is arranged to be struck by the type bars as they approach the platen and which as usual, is connected to the carriage escapement, so as to cause a letter space movement of the carriage each time a type bar is actuated to make an impression. The universal bar consists of a curved strip having two parallel rigidly connected rearwardly extending arms $e$ which are pivoted to the lower ends of two pairs of downwardly extending arms $e'$ $e^2$. These arms are rigidly attached at their upper ends to the ends of a pair of parallel rock shafts $e^3$ $e^4$ which are suitably journaled to lugs on a bracket $e^5$ which is secured in any suitable manner to the rear cross bar $d^2$ of the movable frame D′. One of the arms $e^2$, see Figs. 2–4 and 7, has an auxiliary arm $e^7$ pivoted thereto and extending rearwardly to a pivotal connection with an upright link $e^8$ which is connected at its upper end to the escapement lever of the carriage escapement $e^{17}$, so that the escapement is actuated by the operation of the universal bar. A spring $e^9$ connected to the arm $e^2$ and to the bracket $e^5$ acts to hold the universal bar yieldingly in its normal position, see Fig. 2. The universal bar is arranged above and substantially concentric with the type bar segment in position to be struck by the type bars in each of the three positions of the segment. The type bars strike the universal bar near their longitudinal centers.

Figure 9:
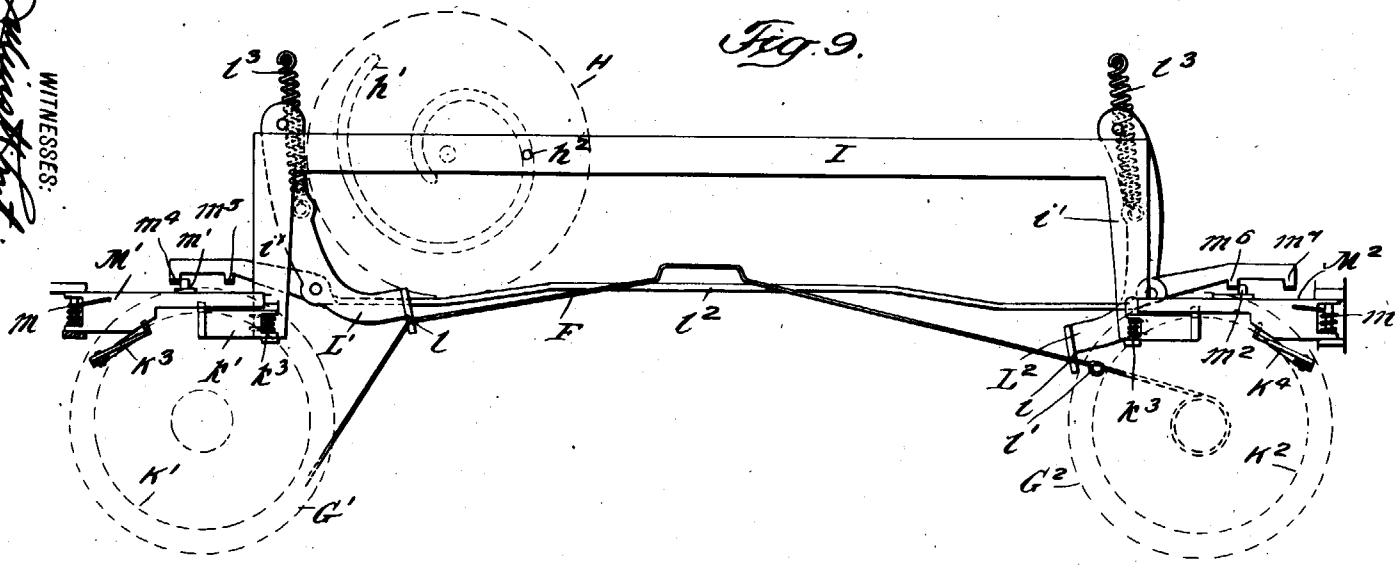
Fig. 9 is a plan view, partly in horizontal section, of the ribbon feeding and feed reversing mechanism.
Figure 10:
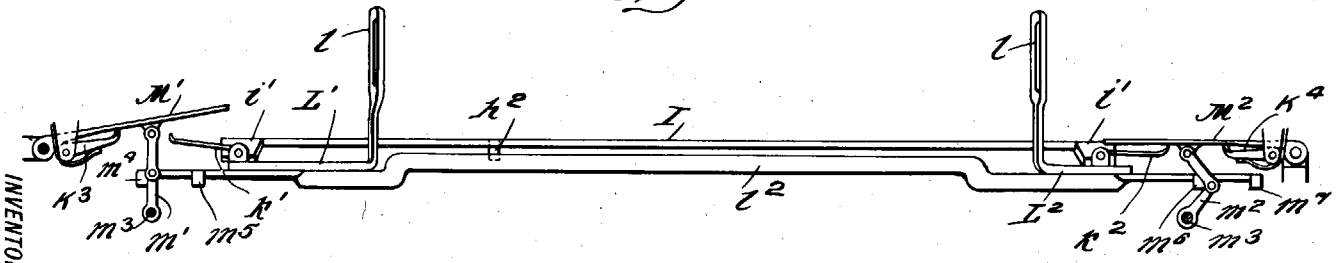
Fig. 10 is a front elevation thereof.

F represents the ink ribbon and G′ $G^2$ the ribbon spools, which may be of ordinary construction and are preferably of a size suitable for a full length standard ribbon one-half inch wide. The spools rest on the upper sides of inwardly extending parts $g$ $g'$ of the movable frame D′, and these parts are preferably made with semi-circular guards $g^2$ which surround the front and outer edges of the spools. The spool shafts $g^3$ are journaled in bearings on the parts $g$ $g'$ of the frame and are provided with any suitable means for causing the spools to turn therewith. The ribbon passes from one spool to the other and is slowly wound from one spool onto the other by feed mechanism, preferably constructed as follows:

H represents a carriage driving spring drum or motor, which, as usual, has an internal operating spring, and is connected to the carriage by a belt or cord $h$. The drum is rotatably mounted under the rear cross bar $d^2$ of the movable frame D′ and has a scroll cam $h'$ on its upper side which engages a pin or part $h^2$ depending from a feed bar I which is seated and adapted to reciprocate parallel with the direction of travel of the carriage in a guide groove $i$ in the rear cross bar $d^2$ under the carriage track. This feed bar is provided at opposite ends with rigid portions or arms $i'$ which extend forwardly through wide slots $i^2$ in the cross bar $d^2$ and are provided at their forward ends with spring actuated pawls $k'$ $k^2$ which coöperate with wheels K′ $K^2$ secured to the lower ends of the spool shafts for rotating the ribbon spools. As shown, the ratchet wheels have downwardly facing teeth, and the pawls are made of sheet metal and pivoted between upturned lugs on the arms of the feed bar, being pressed upwardly toward the ratchet wheels by springs $K^3$, Figs. 7 and 9, surrounding their pivots. When the carriage is drawn to the right to start a new line the cam on the spring drum H forces the feed bar I to the left, and as the line is being written the cam and pin move the feed bar in the opposite direction, thus reciprocating the bar and the feed pawls $k'$ $k^2$. The feed pawls are controlled by a feed reversing mechanism which holds one pawl out of action, while permitting the other pawl to engage and turn its ratchet wheel. One spool is thus rotated intermittently and feeds the ribbon in one direction. When the ribbon is nearly unwound from one spool, feed reversing mechanism operates to throw the active pawl out of action and place the other pawl into action to cause the ribbon to be wound on the other spool and fed in the opposite direction. $K^3$ $K^4$ represent two spring-pressed dogs which are pivoted underneath the frame parts $g$ $g'$ and act to prevent backward motion of the ratchet wheels during the return strokes of the feed pawls.

The feed reversing mechanism is preferably constructed as follows:

L′ $L^2$ represent two reversing levers which are suitably pivoted at their rear ends under the frame cross bar $d^2$ to swing horizontally. These levers have upright front portions adjacent to the ribbon spools provided with guide slots $l$ through which the ribbon passes, and the ribbon is provided near each end with an obstruction $l'$ adapted to engage and move the adjacent reversing lever. The levers are caused to swing together by a connecting bar $l^2$ which extends across the machine in front of the carriage and is pivoted to the reversing levers, and springs $l^3$ connected to the levers and to the supporting frame assist in shifting the levers. These springs are arranged to swing across the pivotal axes of the levers during the movement of the levers and operate to complete the movement of the levers in both directions and to hold them in either position to which they are shifted.

M′ $M^2$ represent pawl controlling plates which are suitably pivoted to the frame D′ and extend adjacent to the edges of the ratchet wheels. Each plate extends over lateral projections on the feed pawl and holding dog for the adjacent ratchet wheel and is adapted when depressed by a spring $m$ surrounding its pivot, to lower and hold the pawl and dog out of engagement with the ratchet wheel. The plates M′ $M^2$ are connected to the upper ends of toggle joints $m'$ $m^2$ respectively, which are connected at their lower ends to fixed pivots $m^3$, supported below the frame D′. The knuckle pin of the toggle joint $m'$ extends between two lugs or fingers $m^4$ $m^5$ on the adjacent end of the connecting bar $l^2$ and the knuckle pin of the other toggle joint $m^2$ extends between corresponding lugs $m^6$ $m^7$ on the opposite end of the connecting bar, see Fig. 9.

In the position of the parts shown in the drawings the toggle joint $m'$ is straightened and holds the pawl controlling plate M′ up off of the pawl and dog for the ratchet wheel K′, while the other toggle joint is bent, permitting the plate $M^2$ to hold the pawl and dog down out of engagement with the ratchet wheel $K^2$. When the toggle joints are straightened they are moved slightly beyond a dead center position, so as to be retained in this position and hold the controlling plates up by the pressure of the plates thereon. The pawl $k'$ is then active and turns the ratchet wheel K′ to wind the ribbon on the left hand spool G′. When the ribbon is nearly unwound from the right hand spool $G^2$, as shown, the obstruction $l'$ on the right hand end of the ribbon engages and moves the reversing lever $L^2$. As soon as the lever is moved past its central position the springs $l^3$ act to throw the reversing levers L′ $L^2$ and connecting bar $l^2$ quickly to the left, and the lug $m^5$ on the bar strikes and breaks the toggle joint $m'$ while the projection $m^7$ strikes and straightens the toggle joint $m^2$. The plate M′ is thus lowered and throws the pawl $k'$ and companion holding dog out of action and the plate $M^2$ is raised, permitting the pawl $k^2$ and companion dog to come into action. The right hand spool $G^2$ will then be turned and wind the ribbon thereon until the obstruction on the other end of the ribbon strikes and similarly operates the reversing lever L′ to again reverse the feed of the ribbon.

The lugs $m^4$ $m^5$ and $m^6$ $m^7$ on the connecting bar $l^2$ are spaced so as to allow lost motion and permit the reversing levers to move past their central positions before the lugs act on the toggle joints $m'$ $m^2$, and the toggle joint that is on the dead center retains that position until suddenly forced off center by the same movement of the bar $l^2$ that forces the other joint onto the dead center position. The feed reversing mechanism is thus operated by a slight pull on the ribbon and acts quickly and positively, and the described construction overcomes the well known fault of a point where both spools are connected to the feed mechanism, or where neither spool is so connected.

The described mechanism turns both spools in the same direction, the ribbon passing around one spool from the rear and around the other from the front. As the reversing levers are in the same relation to the spools there is slightly more strain on the ribbon when reversing from one direction than from the other, but the strain is not sufficient to be objectionable, and the construction makes a most compact, efficient and inexpensive ribbon feeding and feed reversing mechanism.

N represents a ribbon guide or vibrator for vibrating the ribbon to and from the printing position in front of the printing point on the platen. The vibrator, which may be constructed and mounted to reciprocate in any suitable manner is actuated by a vibrator lever O, to which it is detachably connected, for instance, by a projection on the lower end of the vibrator entering a notch in the front end of the lever. The vibrator lever is suitably pivoted at its rear end, on the under side of the bracket $e^5$ and is connected, at different distances from its pivot, by links $p$ $p'$, respectively, to rock-arms $p^2$ $p^3$ of different lengths. These rock-arms are loosely pivoted on the rock shaft $e^3$ which supports and is rocked by the universal bar E. One or the other of these arms $p^2$ $p^3$ is adapted to be connected with the rock shaft $e^3$, so as to rock therewith for producing a longer or shorter throw of the vibrator. For this purpose the arms $p^2$ $p^3$ are arranged in slots in a block Q which is rigidly secured on the rock shaft $e^3$. The arms and block are provided with transverse holes which register when the vibrator lever is in the normal or rest position. $q$ $q'$ represent two slides arranged to slide on the rock shaft $e^3$ at opposite sides of the block Q and provided with pins $q^2$ $q^3$ projecting therefrom into the hole in the block Q. In the position of the slides, shown in Fig 8, the pin $q^3$ extends through the hole in the short rock arm $p^2$ and the other pin is withdrawn from the hole in the long rock arm $p^3$. The short arm will then be connected to the rock shaft $e^3$ and produce a short throw of the vibrator, indicated in Fig. 3, appropriate for using the upper position or field of the ribbon. By moving the slides $q$ $q'$ to the right the pin $q^3$ will be withdrawn from the hole in the short arm $p^2$ and the other pin $q^2$ will be moved into the hole in the long arm $p^3$ and connect this arm to the rock shaft. The throw of the vibrator will then be increased, as indicated in Fig. 4, sufficiently for using the lower portion or field of the ribbon. The slides $q$ $q'$, shown, have tubular extensions $q^4$, Fig. 8, to limit their movement on the rock shaft $e^3$, and have extensions $q^5$ which meet in front of the block Q. A detent spring $q^6$ secured to the arm $e'$ is adapted to snap into notches in the extensions $q^5$ to hold the slides in position to connect either the rock-arm $p^2$ or the arm $p^3$ with the rock shaft.

R represents a bar for shifting the slides $q$ $q'$ to change the throw of the vibrator lever. This bar is slidably mounted on the bracket $e^5$, for instance, by two screws $r$ passing through slots in the bar, and has upwardly extending fingers, $r'$ $r^2$ adapted to engage and move the slides $q$ $q'$. The bar R is connected by a link or rod $r^3$ to an operating lever or key S which is fulcrumed at one side of the frame D′ and extends forwardly to a point where it can be conveniently operated. The link $r^3$ is slidably mounted, for instance, by a screw $r^4$ passing through a slot therein into the frame bar $d^2$, and has a pin $r^5$ entering a hole in the slide bar R, or is otherwise detachably connected to the bar, so as to permit the bar to be detached from the machine with the bracket $e^5$. By moving the front end of the key lever S to the left as far as it will go, the slide bar R will withdraw the pin $q^3$ from the arm $p^2$ and move the pin $q^2$ into the arm $p^3$, and the lower field of the ribbon will thus be brought into use. A depending central lug $r^6$ on the slide bar R acts, when the upper field is in action, to limit the upward movement of the vibrator lever to the exact distance required, as indicated in Fig. 3. The body of the slide bar is of the proper width to similarly limit the movement of the lever when the lower field is in action, as indicated in Fig. 4. This overcomes a quite common fault, as after some wear on the pivots of the vibrating mechanisms in general use, the ribbon is thrown too high.

The slide bar R is adapted to move considerably farther than is necessary to effect the change in field of the ribbon, the object of this being to permit the key lever S to be placed in a central position and the slide $q'$ moved by hand to withdraw the pin $q^3$ from the arm $p^2$ to disconnect the vibrator lever from the control of the universal bar, and thus silence the vibrator. When it is desired to restore the vibrator to action the movement of the key lever S to the right for the upper field, or to the left for the lower field, is all that is necessary. The described construction of the vibrating mechanism provides for the use of a bichrome ribbon, and for stencil work without removing the ribbon, and all within the very small space available in a collapsible typewriter.

It will be observed that the entire mechanism for feeding the ribbon, reversing the feed and vibrating the ribbon is mounted on the movable frame D′ and is constructed so as to be exceedingly compact and so as not to interfere with the collapsing of the machine. When the movable frame D′ is lowered the type bar segment extends up between the ribbon spools which are located in front of the carriage, and the ribbon operating mechanism descends to a position in rear of the segment. While the mechanism is thus especially adapted for a collapsible typewriter of the construction mentioned, it will be evident that it is also applicable to non-collapsible machines. The preferred construction of the mechanism has been described, but this construction can be changed in various details without departing from the spirit of the invention. For instance, the sliding feed bar can be connected to the driving motor and to the spools in other ways, and the ribbon reversing levers can be differently arranged. Also means of other construction can be used for changing the throw of the ribbon vibrator.

It will be observed that one of the important features of this invention is that the ribbon mechanism is supported in its entirety upon the movable member of the frame and that during the act of compacting, as well as the act of extending the machine, the entire ribbon mechanism is maintained in coöperative relation with the platen and is not inverted, but on the contrary, the carriage and associated ribbon mechanism are at all times maintained in their normal or upright positions. While the elements on each frame member are out of coöperative position with the elements of the other group when the machine is compacted, the elements of both groups are maintained in their operative or upright position. It will be seen also that there is no disconnection or separation of parts of the ribbon mechanism when the machine is compacted.

I claim as my invention:

1. In a typewriting machine, the combination of a series of type bars, a universal bar arranged at an elevation above the pivoted ends of the type bars in position to be actuated by the type bars, a rock shaft in the upper part of the machine having arms which movably support said universal bar, a rock arm on said rock shaft, a ribbon vibrating lever, and an operative connection between said vibrating lever and said rock arm, substantially as set forth.

2. In a typewriting machine, the combination of a series of type bars, a universal bar arranged to be actuated by said type bars, a rock shaft having downwardly extending arms in rear of said universal bar, pivotal connections between said arms and said universal bar, a rearwardly extending arm on said rock shaft, a ribbon vibrating lever pivoted in rear of said universal bar, and an operative connection between said vibrating lever and said rearwardly extending arm, substantially as set forth.

3. In a typewriting machine, the combination of a series of type bars, a universal bar arranged to be actuated by said type bars, a rock shaft having supporting arms in rear of said universal bar, pivotal connections between said arms and said universal bar, a rearwardly extending arm on said rock shaft, a ribbon vibrator, a vibrating lever pivoted at its rear end in rear of said rock shaft and connected at its front end to said vibrator, and an operative connection between the central part of said vibrating lever and said rearwardly projecting arm, substantially as set forth.

4. In a typewriting machine, the combination of a series of type bars, a rock shaft having downwardly extending arms, a universal bar movably supported by said arms in position to be actuated by said type bars, a rearwardly extending arm on said rock shaft, a ribbon vibrator arranged in front of said rock shaft, a vibrating lever pivoted in rear of said rock shaft and extending forwardly under said shaft and connected to said vibrator, and a link connecting said vibrating lever to said rearwardly extending arm, substantially as set forth.

5. In a typewriting machine, the combination of a series of type bars, a universal bar, a rock shaft which movably supports said universal bar in position to be actuated by said type bars, a ribbon vibrating lever, a pair of arms loosely mounted on said rock shaft, links connecting said arms to said vibrating lever at different distances from its fulcrum, and means for operatively connecting either of said arms to said rock shaft, substantially as set forth.

6. In a typewriting machine, the combination of a series of type bars, a universal bar, a rock shaft which movably supports said universal bar in position to be actuated by said type bars, a ribbon vibrating lever, arms of different lengths loosely mounted on said rock shaft, links connecting said arms to said vibrating lever, and means for operatively connecting one or the other of said arms to said rock shaft to rock therewith, substantially as set forth.

7. In a typewriting machine, the combination of a series of type bars, a universal bar, a rock shaft which movably supports said universal bar in position to be actuated by said type bars, a ribbon vibrator, a vibrating lever pivotally mounted at its rear end and connected at its front end to said vibrator, a pair of rearwardly extending arms loosely mounted on said rock shaft, links connecting said arms to the central part of said vibrating lever, and means for operatively connecting one of said arms to and disconnecting said other arm from said rock shaft, substantially as set forth.

8. In a typewriting machine, the combination of a series of type bars, a universal bar which is actuated by the type bars, a ribbon vibrating lever, means for operatively connecting said vibrating lever to said universal bar to cause the lever to move different distances, and an actuating bar for said connecting means having parts for positively limiting the movement of said vibrating lever to the exact distances intended, substantially as set forth.

9. In a typewriting machine, the combination of a series of type bars, a universal bar which is actuated by said type bars, a ribbon vibrating lever, means for operatively connecting said vibrating lever to said universal bar to cause the lever to move different distances, and an actuating bar for said connecting means which is movable transversely of said vibrating lever and provides stops for limiting the movement of the lever to the exact distances intended, substantially as set forth.

10. In a typewriting machine, the combination of a series of type bars, a universal bar actuated by said type bars, a ribbon vibrating lever, means for operatively connecting said vibrating lever to said universal bar to cause the lever to move one or another distance, and a slide for changing the movement of said vibrating lever and for positively limiting the movements of said lever to the distances intended, substantially as set forth.

11. In a typewriting machine, the combination of a transversely movable carriage, a motor which moves said carriage in one direction, a pair of ribbon spools mounted in front of said carriage, a ribbon feed bar arranged to move parallel with the direction of movement of said carriage and having rigidly connected forwardly extending arms, and means for operatively connecting said feed bar to said motor and said arms to said spools, substantially as set forth.

12. In a typewriting machine, the combination of a transversely movable carriage, a motor for moving said carriage in one direction, a pair of ribbon spools mounted in front of said carriage, a feed bar which is reciprocated by said motor in a direction parallel with the direction of movement of said carriage, rigidly connected forwardly extending arms on said feed bar, and means actuated by said arms for turning said ribbon spools, substantially as set forth.

13. In a typewriting machine, the combination of a transversely movable carriage, a motor for moving said carriage in one direction, a pair of ribbon spools mounted in front of said carriage, a feed bar arranged to slide parallel with the direction of movement of said carriage and having forwardly extending rigidly connected arms adjacent to said spools, an operative connection between said feed bar and said motor, and means for operatively connecting one of said spools to the adjacent arm of said feed bar and disconnecting the other spool from the other arm of said feed bar, substantially as set forth.

14. In a typewriting machine, the combination of a transversely movable carriage, a pair of ribbon spools mounted in front of said carriage, a feed bar arranged beneath said carriage to reciprocate in a direction parallel with the direction of movement of the carriage and having rigidly connected forwardly extending arms adjacent to said spools, means for reciprocating said feed bar, and means for operatively connecting one of said spools to the adjacent arm of said feed bar and disconnecting the other spool from the arm of said feed bar, substantially as set forth.

15. In a typewriting machine, the combination of a series of upwardly and rearwardly swinging type-bars, a transversely movable platen carriage, a pair of ribbon spools mounted in front of the plane of the type bar pivots, a bar arranged in rear of the plane of said pivots to reciprocate transversely of the machine and having forwardly extending rigidly connected arms adjacent to said spools, a motor for reciprocating said feed bar, and operative connections between the forwardly extending arms and the spools for rotating one or the other spool, substantially as set forth.

16. In a typewriting machine, the combination of a transversely movable carriage, a motor acting to move the carriage in one direction, a sliding bar connected to the motor to reciprocate parallel with the carriage, a pair of forwardly projecting arms rigidly connected to said bar, a pair of ribbon spools, ratchet wheels connected to said spools, a pair of pawls mounted on said arms to act on the ratchet wheels, and means for holding one or the other of the pawls out of operative relation to its ratchet wheel, substantially as set forth.

17. In a typewriting machine, the combination of a transversely movable carriage, a motor acting to move the carriage in one direction, a sliding bar having a direct positive connection with the motor whereby the bar is caused to move parallel with the carriage at all times, a pair of rigid arms projecting from said sliding bar, a pair of ribbon spools, and means for operatively connecting either of said arms to one of the spools, substantially as set forth.

18. In a typewriting machine, the combination of a transversely movable carriage, a motor mounted under the carriage and acting to move the carriage in one direction, a sliding bar arranged under the carriage and connected to the motor to move therewith, a pair of forwardly projecting arms rigidly connected to the sliding bar, a pair of ribbon spools, and means whereby either of said arms may be operatively connected to one of the spools, substantially as set forth.

19. In a typewriting machine, the combination of a transversely movable carriage, a rotary motor acting to move the carriage in one direction, a sliding feed bar connected to the motor to move at all times therewith, a pair of forwardly projecting arms rigidly connected to the feed bar, a pair of rotary ribbon spools, means for connecting either of said arms to one of the spools in a way to move the spool when the carriage is moved by the motor, and to permit the spoool to remain stationary when the carriage is moved in the opposite direction, substantially as set forth.

20. In a typewriting machine, the combination of a transversely movable carriage, a rotary motor acting to move the carriage in one direction, a sliding bar having a pin and cam connection with the motor whereby the bar reciprocates with the carriage, a pair of arms rigidly connected to and projecting from the sliding bar, a pair of rotary ribbon spools, and means for operatively connecting either of said arms to one of the spools, substantially as set forth.

21. In a typewriting machine, the combination of a transversely movable carriage, ribbon spools arranged in front of the carriage, a ribbon feed bar arranged at the rear portion of the machine and having rigidly connected arms extending forwardly toward said spools, means for reciprocating said feed bar transversely of the machine, and means operated automatically when the ribbon is nearly unwound from either spool for operatively connecting one of said arms to the adjacent spool and disconnecting the other arm from the other spool, substantially as set forth.

22. In a typewriting machine, the combination of ribbon spools, means for turning one or the other of said spools to wind the ribbon thereon, a pair of ribbon guide levers pivoted in rear of said spools and adapted to be moved by the ribbon when the ribbon is nearly unwound from one spool and acting when turned on their pivots to reverse the direction of feed of the ribbon, and a connecting bar located in rear of the spools and which is pivotally connected to said guide levers in front of the lever pivots, substantially as set forth.

23. In a typewriting machine, the combination of a pair of spools for a ribbon which has an obstruction near each end, mechanism for turning one or the other of the spools to wind the ribbon thereon, a pair of ribbon guide levers adapted to be actuated by said obstructions and acting when turned on their pivots to reverse the direction of feed of the ribbon, a transverse bar located in rear of the spools and pivotally connected to the guide levers to cause them to move in unison, and a spring acting to yieldingly resist the initial movement of the guide levers and to complete the movement thereof, substantially as set forth.

24. In a typewriting machine, the combination of a pair of spools for ribbon mechanism for turning one or the other of the spools to wind the ribbon thereon, a pair of levers pivotally mounted at their rear ends and having ribbon guides at their front ends, a transverse bar connecting the central parts of the levers and acting to cause the levers to move in unison, and a contractile spring connected to a fixed support in rear of one of the lever pivots and to the lever in front of its pivot whereby the spring is adapted to swing across the lever pivot and to yieldingly hold the lever at either end of its movement, substantially as set forth.

25. In a typewriting machine, the combination of a carriage, a series of upwardly and rearwardly swinging type-bars, a pair of ribbon spools mounted in front of the plane of the type bar pivots, mechanism for turning the spools, a pair of guide levers, the ribbon connecting the spools acting to swing the guide levers alternately in opposite directions, a bar located in rear of the plane of the type bar pivots and connecting said levers, and means actuated by said bar for connecting one spool to and disconnecting the other spool from the means for turning the spools, substantially as set forth.

26. In a typewriting machine, the combination of a carriage, a series of upwardly and rearwardly swinging type bars, a pair of ribbon spools mounted in front of the plane of the type bar pivots, and a pair of bars in rear of the plane of the type bar pivots movable parallel with the carriage, and means whereby one of said bars acts to turn the spools and the other to connect said spools alternately to the means for turning the spools, substantially as set forth.

27. In a typewriting machine, the combination of a transversely movable carriage, a pair of ribbon spools arranged in front of the carriage, a pair of bars arranged transversely of the machine in rear of said spools, means operated by one of said bars for turning said spools, and means operated by said second bar for rendering the turning means for one of said spools active and the turning means for the other spool inactive, substantially as set forth.

28. In a typewriting machine, the combination of a pair of ribbon spools, a driving ratchet wheel for each spool, a driven pawl for each ratchet wheel, and connections comprising substantially rigid parts flexibly connected which are actuated directly by the ribbon and act to simultaneously lock one of said pawls out of operative position and release the other pawl from such locked position, substantially as set forth.

29. In a typewriting machine, the combination of a pair of ribbon spools, a driving ratchet wheel for each spool, a driving pawl for each ratchet wheel, a driving pawl controller for each pawl, a toggle joint for each controller acting when on dead center to positively hold the pawl out of operative position, and means acting to move one toggle joint out of dead center position and simultaneously force the other toggle joint into such position, substantially as set forth.

30. The combination in a collapsible typewriting machine having a series of type bars, and a platen carriage which is movably supported and is movable from an elevated operative position to a lower inoperative position in rear of the type bars, of ribbon spools arranged in front of the carriage to move up and down therewith, and a reciprocating feed bar which is operatively connected to said spools and is arranged transversely of the machine in position to be lowered with the carriage in rear of the type bars, substantially as set forth.

31. The combination in a collapsible typewriting machine having a series of type bars, and a platen carriage which is movably supported and is movable from an elevated operative position to a lower inoperative position in rear of the type bars, of ribbon spools arranged in front of the carriage to move up and down therewith, a reciprocating feed bar which is operatively connected to said spools and is arranged transversely of the machine in position to be lowered with the carriage in rear of the type bars, and a feed reversing device also arranged in position to be lowered with the carriage in rear of the type bars, substantially as set forth.

32. The combination in a collapsible typewriting machine having a series of type bars, a platen carriage which is movably supported and is movable from an elevated operative position to a lower inoperative position in rear of the type bars, of ribbon spools arranged in front of the carriage to move up and down therewith, a reciprocating feed bar which is operatively connected to said spools and is arranged transversely of the machine in position to be lowered with the carriage in rear of the type bars, and a feed reversing device and a ribbon vibrating mechanism also arranged in position to be lowered with the carriage in rear of the type bars, substantially as set forth.

33. In a typewriting machine, the combination of a support, ribbon spools, a power driven scroll cam, and means operated by said cam to rotate said spools.

34. In a typewriting machine, the combination of a support, a carriage, ribbon spools, a motor for driving the carriage along said support, a scroll cam operated by the motor, a bar operatively connected to the cam and to the spools and having a step-by-step movement with the carriage in its forward movement, and a movement corresponding to the movement of the carriage during its backward movement.

35. In a typewriting machine, the combination of a support, a carriage movable along said support, ribbon spools, a ratchet wheel for each spool, a driving and a holding pawl for each spool, means for moving the driving pawls, plates for controlling the engagement and disengagement of said pawls, a reversing lever for each spool adapted to be moved by the ribbon, a rod connecting the levers to move in unison, spring means for throwing the reversing levers quickly to one side when moved a certain distance by the movement of the ribbon, and means operated by the levers to position said plates and disengage one set of pawls and cause the other pawls to engage their cooperating ratchet wheel.

36. In a typewriting machine, the combination of a support, a carriage movable along said support, ribbon spools, means for rotating the spools, pivotally held reversing levers connected to move in unison and adapted to be moved by the ribbon, an arm pivotally held to each lever, toggles having a lost motion connection with said arms, springs for completing the movement of the reversing levers when swung across the pivotal axis of said levers, and means operated by said toggles for controlling the spool-rotating means and determining which spools shall be rotated.

37. In a typewriting machine, the combination of a support, a carriage movable along said support, ribbon spools, means for driving the carriage, means operated by the carriage driving means for rotating the spools, said spool rotating means being operated in the opposite direction by the carriage in its backward movement, pivotally held reversing levers adapted to be moved by a ribbon, arms pivotally connected together and to the reversing levers, said arms having lugs spaced apart, springs for completing the movement of the reversing levers when swung across the pivotal axis of said levers, toggle levers operated by said lugs, and pivotally held plates for controlling the spool driving means.

38. In a typewriting machine, the combination of a support, a carriage movable along said support, ribbon spools, ratchet and pawl mechanism for rotating the spools, pivotally held reversing levers connected to move in unison and adapted to be moved by the ribbon, arms pivotally held to the reversing levers, plates operatively connected to the arms and having an up and down movement and controlling the engagement and disengagement of the pawls, and springs for completing the movement of the reversing levers when swung across the pivotal axis of said levers.

39. In a typewriting machine, the combination of a support, a carriage movable along said support, ribbon spools, ratchet-and-pawl mechanism for rotating the spools, pivotally held reversing levers, arms pivotally held to the reversing levers and to each other, plates for controlling the engagement and disengagement of the pawls, and an operative engagement between the arms and said plates.

40. In a typewriting machine, the combination of a carriage, a ribbon vibrator for moving a ribbon to cover and uncover the printing point, a rock shaft, two arms of relatively different lengths mounted on the rock shaft and operatively connected to the vibrator at different distances from said rock shaft, a universal bar operatively connected to move said rock shaft, means for moving the universal bar, and means mounted on said rock shaft to connect either arm to said shaft one at a time to move the vibrator different distances or to disconnect said arms to permit the vibrator to remain inactive.

41. In a typewriting machine, the combination of a carriage, a ribbon vibrator for for moving a ribbon to cover and uncover the printing point, two pivotally held movable arms connected to the vibrator at relatively different distances from their pivots to impart different throws to the vibrator, and means for connecting and disconnecting said arms to operate the vibrator one at a time.

42. In a typewriting machine, the combination of a carriage, a ribbon vibrator for moving the ribbon to and from the printing point, a vibrator lever, a rock shaft, two arms loosely mounted on said shaft, two links connecting said arms to the lever at different distances from the rock shaft, means for rocking said shaft, means mounted on said shaft to connect to or disconnect said arms from said shaft, and manually operated means for moving the said means on the shaft.

43. In a typewriting machine, the combination of a carriage, a ribbon vibrator for moving the ribbon to and from the printing point, a vibrator lever, a rock shaft, two arms loosely mounted on said shaft, links connecting the arms to the vibrator lever at different distances from the rock shaft, means for rocking said shaft, slides mounted on said shaft having means to lock either of said arms to the shaft, and a pivotally held lever operatively connected to move the slides.

44. In a typewriting machine, the combination of a carriage, a ribbon vibrator for moving the ribbon to and from the printing point, a rock shaft, two arms having openings therein and loosely mounted on said shaft, links operatively connecting the arms to the vibrator to impart different throws thereto, slides mounted on said shaft having pins to enter said openings in the arms to lock said arms to the rock shaft, a bar for moving said slides, a rod having a loose connection with said bar to permit the disconnection of said bar from said rod, and a manually operative lever pivotally mounted to extend forwardly of the machine and connected at its inner end to operate the rod.

45. In a visible typewriting machine, the combination of type bars, a support for the type bars, a second support, a platen carriage movable with said support from an elevated position to a lower and more compact position while maintained in an upright position, keys operatively connected to the type bars, a universal bar mounted on the carriage support, a ribbon vibrator operatively connected to the universal bar also mounted on said support, ribbon spools and means for rotating said spools mounted on the carriage support, and automatic ribbon reversing mechanism also mounted on said carriage support and partaking of the compact movement.

46. In a visible typewriting machine, the combination of a main frame comprising relatively movable parts adapted when one of the parts is moved in one direction to be compact and in the opposite direction to be extended and in normal operative position, a platen carriage, ribbon vibrating mechanism, mechanism for feeding the ribbon lengthwise, automatic ribbon reversing mechanism, a universal bar operatively connected to the ribbon vibrating mechanism, all mounted upon one part of said frame, and a key action and type bars mounted upon the other part to adapt the two parts of the frame to be moved to a compact position and to place the universal bar and ribbon mechanism in an inoperative position with relation to the key action.

47. In a visible typewriting machine, the combination of a main frame comprising relatively movable parts adapted when one of the parts is moved in one direction to be compact and in the opposite direction to be extended and in normal operative position, said parts being pivotally held to each other to permit one part to move up and down with respect to another part, a platen carriage ribbon vibrating mechanism, ribbon reversing mechanism, a universal bar operatively connected to the ribbon vibrating mechanism, carriage propelling mechanism also operated to move a part of the ribbon mechanism, all mounted upon one member of said frame, and a key action mounted on the other member to adapt the two said parts of the frame to be moved to a compact position and to place the universal bar and ribbon mechanism in an inoperative position with relation to the key action.

48. In a typewriting machine, the combination of a two-part main frame movably held together to permit relative movement to reduce the dimension of the frame when the members are moved relatively while in an upright position from a normal operative position to a compact position, ribbon vibrating mechanism and a universal bar operatively connected to move the ribbon to and from the printing point and means whereby the ribbon may be permitted to remain inactive for stenciling purposes, means for feeding the ribbon lengthwise including a feed bar and ratchet-and-pawl mechanism, all mounted upon one part of the frame, a platen carriage also mounted upon said part of the frame, and a key action including key-operated levers, type bars operatively connected to the levers, and means for shifting the type bars all mounted on the other part of the frame, said type bars being adapted to operate the universal bar to vibrate the ribbon and the parts mounted upon different parts of the frame being entirely separate to adapt the said parts to be moved with respect to each other from a normal operative position to a compact position with the frame parts on which they are mounted.

49. In a collapsible typewriting machine, the combination of a stationary frame member, a movable frame member supported upon the stationary member and having a relative vertical movement toward and from said member, a platen carriage supported on the movable member, a type segment supported on the stationary member, type bars supported in the segment and having an upward and rearward movement, a key action for actuating the type bars, means supported on the movable member for moving the carriage in one direction step-by-step, a reciprocating feed-bar supported on the movable member transversely of the machine and partaking of the step-by-step movement and the return movement of the carriage, ribbon spools supported on the movable member at opposite sides of the type segment, and connections between the feed bar and said spools for rotating the spools, said feed bar and carriage being movable to a point in rear of the type segment when the movable member is lowered to collapse the machine.

50. In a collapsible typewriting machine, the combination of a stationary frame member, a movable frame member supported upon the stationary member and having a relative vertical movement toward and from said member, a platen carriage supported on the movable member, a type segment supported on the stationary member, type bars supported in the segment and having an upward and rearward movement, a key action for actuating the type bars, means supported on the movable member for moving the carriage in one direction step-by-step, a reciprocating feed-bar supported on the movable member transversely of the machine and partaking of the step-by-step movement and the return movement of the carriage, ribbon spools supported on the movable member at opposite sides of the type segment, means extending forwardly from the feed bar adjacent each end thereof adapted to rotate the spools when the feed bar is moved in one direction, and feed-reversing means supported on the movable member and operatively connected with the spool rotating means to simultaneously render the rotating means for one spool operative and the other spool rotating means inoperative, said feed bar and feed reversing means being movable with the platen carriage to a point in rear of the type segment when the movable member is lowered to collapse the machine.

Witness my hand this 25th day of January, 1916.

EMMIT G. LATTA.

Witnesses:
ANNA A. T. DALTON,
ETHEL E. HARTZ.